United States Patent
Navab (10) Patent No.: US 6,675,091 B2
(45) Date of Patent: Jan. 6, 2004

(54) SYSTEM AND METHOD FOR TRACKING, LOCATING, AND GUIDING WITHIN BUILDINGS

(75) Inventor: Nassir Navab, Plainsboro, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 10/298,495

(22) Filed: Nov. 18, 2002

(65) Prior Publication Data

US 2003/0135324 A1 Jul. 17, 2003

Related U.S. Application Data

(60) Provisional application No. 60/333,104, filed on Nov. 20, 2001.

(51) Int. Cl.[7] ............................ G01C 21/32; G06F 11/30
(52) U.S. Cl. ........................................ 701/207; 702/186
(58) Field of Search ........................ 701/200, 202, 701/207–208, 222, 223, 300; 702/127, 134–135, 150, 158, 186, 188; 342/60, 357.01, 357.07, 357.08, 357.09; 455/446, 73, 463; 340/325.06

(56) References Cited

U.S. PATENT DOCUMENTS

| | | | | |
|---|---|---|---|---|
| 5,479,408 A | * | 12/1995 | Will | 370/313 |
| 5,548,637 A | * | 8/1996 | Heller et al. | 379/201.07 |
| 6,442,507 B1 | * | 8/2002 | Skidmore et al. | 702/186 |

OTHER PUBLICATIONS

Geissler et al (US 2003/0109988).*
Saitta (US 2002/0072881).*

* cited by examiner

Primary Examiner—Thu Nguyen (57) ABSTRACT

This invention relates to positional tracking, locating, and guiding individuals and robotic devices within buildings. An embodiment of the invention includes a method for tracking, locating, and guiding an entity within a building, that has the steps of emergency personnel arriving at the location, determining if digital floor plans are available, downloading digital floor plan data of a building, entering the digital floor plan data of the building into a server, displaying placeholder locations within the building, activating the tracking devices by affixing the tracking devices to the placeholders, determining if the server placeholder locations were used, inputting placeholder locations that were used, and displaying a combination of said location data and said building floor plans to a user.

22 Claims, 6 Drawing Sheets

SYSTEM AND METHOD FOR TRACKING, LOCATING, AND GUIDING WITHIN BUILDINGS

CROSS REFERENCE TO RELATED APPLICATION

This application claims the benefit of U.S. Provisional Application Serial No. 60/333,104, filed on Nov. 20, 2001, which is incorporated by reference herein in its entirety.

FIELD OF THE INVENTION

This invention relates to positional tracking, locating, and guiding individuals and robotic devices within buildings and their nearby surroundings.

BACKGROUND OF THE INVENTION

Emergency response operations in complex buildings, including high-rises, can require knowledge of a building's floor plan. This allows the emergency response personnel to establish the best routes for entry into a building and exit out of a building, as well as, the best routes to a local emergency scene and any other specified location within a building and its nearby surroundings.

When an emergency, for example, a fire, occurs in complex buildings such as high-rises, the emergency response personnel need to be given the right information about the building, its entrances, its exits, and its access paths to various rooms, floors, stairways, and access corridors.

The emergency response personnel's officers have a need to monitor their crew and equipment, in addition to knowing the crews whereabouts. Equipped with building floor plan information, the officers would be able to assign and guide their crew and equipment throughout the entire building and its nearby surroundings. Concurrently, the officers will be able to use the crew's location information to ensure the safety of the crew.

Complex buildings and high-rises are required to have updated floor plans at all times to help emergency response personnel during emergency rescue and building evacuation. When the number of floor plans and the floor plans' complexity increases, it is preferred and often required, to have the floor plan documents in digital format.

In general, it can be presumed that emergency response personnel may not be familiar with a particular building. This unfamiliarity makes it more difficult to quickly master a particular building's floor plans. In some cities, building management is required to have a person available at all times to aid the emergency response personnel in reading a building's floor plans, so that, in the event of an emergency, the emergency response personnel can be guided throughout the building and its nearby surroundings.

Even if floor plans are available in digital format and a person familiar with the building is available for help, the emergency response personnel would still have a need to know where they are within the building and its nearby surroundings at all times. At the very minimum, since the emergency response personnel's officers will have to guide the emergency response personnel throughout the building and its nearby surroundings, the officers have a need to know where the emergency response personnel are within the building and its nearby surroundings.

Currently, various tracking, locating and guidance systems exist. These systems usually include one or multiple signal transmitters and receivers. Using the information from the transmitters and receivers, the system computes the relative positioning in real-time, i.e., the system can estimate the position of each receiver or transmitter in relation to others. Tracking, locating, and guidance systems can use triangulation techniques to estimate those positions.

The current tracking systems can be expensive and do not track an entity's location in relation to a building's floor plans. Additionally, it is not practical to equip all buildings with tracking systems.

A need exists for a portable tracking system that can be placed in a building, provide location data of an entity to be tracked, correlate the location data to a building's floor plans, and display the entity's location within the building.

SUMMARY OF THE INVENTION

A method according to an embodiment of the invention for tracking, locating, and guiding an entity within a building is described within the application. The method comprises, entering a digital floor plan of a building into a server, installing tracking device placeholders in the building, indicating the placeholder locations on the digital floor plan, activating tracking devices by connecting the tracking devices to the placeholders, using a server to receive location data transmitted by the tracking devices and to display the location data on the building's digital floor plan.

A system according to an embodiment of the invention for tracking, locating, and guiding an entity within a building is described within the application. The system, comprises, a digital floor plan of a building, a server for processing the digital floor plan of the building, placeholders installed at various locations within the building for receiving the tracking devices, a location indicator device for indicating various placeholder locations on the digital floor plan, and tracking devices connected to the placeholders for reception and transmission of location data of the entity to the server for display on the digital floor plan.

The embodiments of the present invention will become more apparent from the following detailed description of illustrative embodiments thereof, which is to be read in connection with the accompanying drawings.

DETAILED DESCRIPTION OF PREFERRED EMBODIMENTS

Embodiments of the present invention will be described and can be used for fire fighting and rescue operations in addition to many other emergency and non-emergency applications that require tracking, locating, and guiding individuals or robotic devices within buildings and their nearby surroundings.

In a preferred embodiment of the invention, a system has a placeholder, for example, an electronic receptacle, that is housed within the existing fixtures, for example, fire-extinguisher cabinets, throughout the building. Tracking devices can then be affixed to the placeholder by emergency personnel or other qualified individuals. In all office buildings and high-rise buildings, fire-extinguisher cabinets and fire-extinguishers are judiciously positioned within the building to be used in the event of a fire. It is necessary to locate the position of all fixtures, such as, fire-extinguisher cabinets and fire-extinguishers, on a building's floor plans. By noting the locations of the fixtures on the floor plans, the system will be able to use the height of the placeholders and their location within the building as a positional placement parameter of the tracking devices.

In case of an emergency, such as a fire, in one or multiple rooms and floors, the system will estimate the best accessible locations for the tracking devices that are brought in by emergency response personnel. Based on a building's floor plans and variable parameters of each location, the system indicates all possible choices of tracking device locations. Once the emergency response personnel affix the tracking devices into the placeholders, the emergency response personnel can enter the tracking device placeholder location information into the system so that the system will know where the tracking devices are positioned.

Alternatively, a simple sensor installed in the fire-extinguisher cabinets and fire-extinguisher locations can activate and detect the presence of a tracking device that has been affixed into a placeholder within the fire-extinguisher cabinets. Knowing where the tracking devices are located, the system has full access to the coordinate system of the building. The system is therefore able to convert the three dimensional positions given by the tracking system into the metric coordinate system of the building described in the digital floor plans. This is accomplished by using the pre-defined locations of placeholders within the fixtures.

Once the system detects the location of a tracked entity in the building's floor plan coordinate system, the location information is combined with the digital floor plan of the building and viewable using an electronic display device, for example, a computer screen.

A system according to another embodiment of the present invention can include a server located in a vehicle, a server located inside the building, a server located outside the building, a handheld device, or a device that is wearable by emergency response personnel or their officers. An electronic display device, for example, a computer screen, a handheld device, wearable device, or a head mounted display/viewer, can be used to view location data and the building's digital floor plans.

The emergency response personnel can view the information using an electronic display device or similar device, or the system can provide the emergency response personnel with the information through a simple text-to-speech based interface. If predetermined evacuation paths are indicated on the digital floor plans, the system informs the emergency personnel member where he/she is located, and how to follow a desired access/evacuation path throughout a building.

A system according to another embodiment of the present invention can include stationary tracking devices and non-stationary sensors, however, the system can further include sensors that are stationary and tracking devices that are non-stationary.

A system according to another embodiment of the present invention can include building preparation and emergency personnel implementation. Building preparation includes having a digitized version of the building's floor plans available for input into the system. Additionally, building preparation includes having the fixtures, such as the fire-extinguisher cabinets and fire-extinguisher locations within the building equipped with placeholders. Each building's management organization should be responsible for executing the building preparation process and for having the digital floor plans ready for use by emergency response personnel in case of emergency.

Emergency personnel implementation includes affixing the tracking devices into the placeholders, as well as, operating the system that controls the tracking devices. The implementation is executed by emergency response personnel in collaboration with the building's management/security personnel.

All of the floor plans are stored in digital format. The system can display all of a building's floor plans on a computer terminal screen or similar electronic display device. Input to the system includes the ordering of the buildings' floor plans in terms of consecutive floors and the height of each floor relative to the ground or to the previous floor. Ordering of the buildings' floor plans can be prepared by a third party consulting company or the building's facility management.

The location of each fixture having a placeholder, such as a fire-extinguisher cabinet and fire-extinguisher may already be indicated on the floor plan. If this is not the case, the system allows the emergency response personnel to indicate all of the fixture locations actually used.

In a preferred embodiment of the present invention, a simple standard is created if all of the placeholders for tracking devices are installed within a building, at the same height relative to the floor. Alternate embodiments of the present invention could vary the heights of the placeholders within a building. If standard placeholder heights are not used within a particular building, the system allows entry of the various placeholder heights into the system.

Based on the working range of different tracking devices, the system estimates the possible area coverage using the position of the tracking devices installed in the placeholders at different fixture locations, such as, placeholders in fire-extinguisher cabinets or in fire-extinguisher locations. The system can use triangulation techniques to locate the entities to be tracked.

For example, tracking devices receive simultaneous signals from a series of sensors, then the tracking devices send the information to the system which estimates the distance $D_{ij}$ between sensors $R_i$, $i=1 \ldots N$, and each of the tracking devices $T_j$, $j=1 \ldots M$. The system estimates the location of the sensors $R_i$ by intersecting the spheres of radius $D_{ij}$ around each tracking device $T_j$.

Another embodiment of the present invention can use triangulation techniques that include tracking devices receiving simultaneous signals from a series of sensors. The tracking devices send the information to the system which estimates the line of sight $L_{ij}$ between sensors $R_i$, $i=1 \ldots N$, and each of the tracking devices $T_j$, $j=1 \ldots M$. The system estimates the location of the sensors $R_i$ by intersecting the line of sights $L_{ij}$ for each transmitter $T_j$.

Location and orientation techniques of devices that can be displayed on floor plans are also discussed in "An Augmented Reality System," U.S. patent application Ser. No. 10/263,578, which is incorporated by reference herein in its entirety.

Based on the transmission range that the tracking device can cover, the system displays alternatives to the emergency response personnel or other personnel, of the best possible locations for placement of the tracking devices within the building's fixtures, such as, the fire-extinguisher cabinets and fire-extinguisher locations. The calculation can be performed once for all possible emergency cases. The results can be saved on electronic storage devices by the building's management personnel.

A system according to another embodiment of the present invention computes all possible rescue and building evacuation paths in advance. It is recommended but not required, that the evacuation path information only be used as an aid to emergency response personnel. It may be preferable in general to let the emergency response personnel or their officers make a decision concerning the best building evacuation path to take during a rescue operation. However, predetermined building evacuation paths could serve as a reference if necessary. The usage of predetermined paths are more beneficial when used in conjunction with the system since the system references the floor plans on which the building evacuation paths are defined.

As the emergency response personnel arrive at a building, the emergency response personnel should be able to access the building's management information system. Accessing the building's management information system can be done with the aid of building management personnel or by the emergency response personnel themselves should local regulations authorize such access. The information system informs the emergency response personnel of the location(s) of the emergency incident that is being responded to.

Alternatively, the emergency response personnel can input into a system according to another embodiment of the present invention, the location(s) of the emergency incident (s).

Using an electronic display device, the system displays all possible predetermined tracking device placeholder locations where the emergency response personnel can affix their tracking devices. If necessary, the system orders the placeholder locations in terms of accessibility and accuracy of the triangulation computation results.

The emergency response personnel affix the tracking devices at the system indicated placeholder locations or at placeholder locations that the emergency response personnel decide to be the most beneficial to suit the emergency situation encountered. If the emergency response personnel do not choose to use the placeholder locations that are displayed by the system, the emergency response personnel can input the placeholder locations actually used into the system.

Alternatively, inexpensive and passive sensors could have been previously installed into the placeholders within the fixtures. The sensors can automatically detect the presence of tracking devices that have been affixed to the placeholders by the emergency response personnel. The sensors could then activate the tracking device so that the tracking device can transmit tracking location information to the system.

When all of the tracking devices necessary to respond to the emergency situation are in the placeholders, the emergency response personnel can activate the system. The results coming from tracking devices are in the locale coordinate system relative to the sets of tracking devices being used. This information is communicated to the building's information system, which then overlays it onto the coordinate system of the building's floor plans.

The emergency response personnel need to either download the local information onto their mobile/wearable devices or into the emergency response personnel's main server. The main server can be installed in a vehicle, for example, a fire truck. If the local information is downloaded into the emergency response personnel's main server, the emergency response personnel's mobile/wearable devices need to be in wireless communication with the emergency response personnel's main server.

Alternatively, a main information system in the building that has the local information installed in it can communicate directly with the emergency response personnel's mobile/wearable devices and the emergency response personnel's main server, through a wireless or cabled network.

As the emergency response personnel proceed through the building and access a new area with a different set of floor plans, the main server transmits updated location information to the emergency response personnel's mobile/wearable devices. Since the main server and the mobile/wearable devices are constantly communicating with each other, updated location information can be easily and accurately transmitted to the emergency response personnel.

It is recommended but not required to provide the emergency response personnel's officers with a larger stationary or handheld monitor device, so that the officers can monitor all of their personnel and equipment locations throughout the building and its nearby surroundings in a real-time mode.

Figure 1:
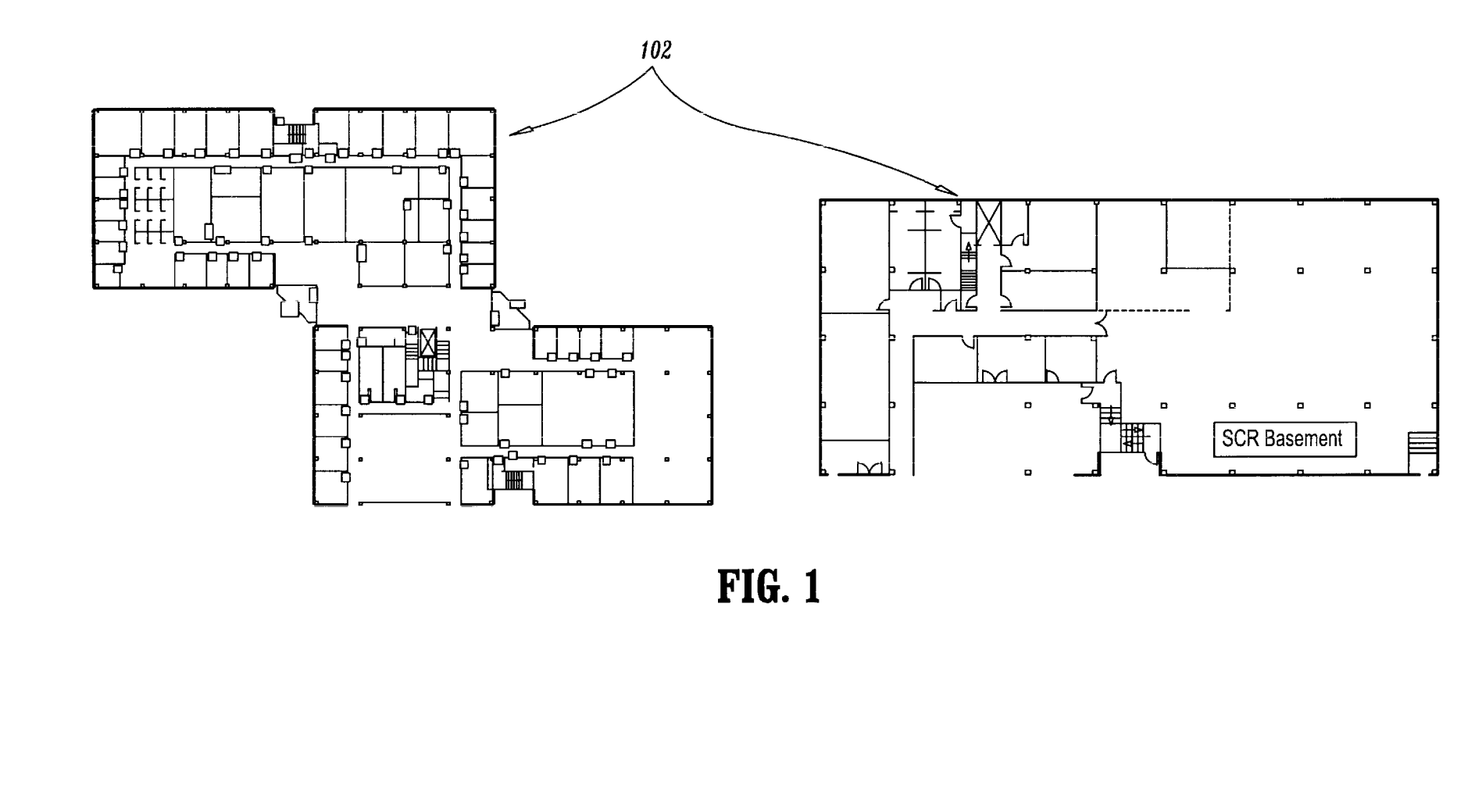
FIG. 1 illustrates digital floor plans that can be used according to an embodiment of the present invention.

FIG. 1 depicts digital floor plans 102 that can be used in an embodiment of the present invention. The digital floor plans 102 of the building are input into the tracking, locating, and guiding system. The system will overlay the floor plans with information related to the location of the entity that is being tracked. The location information is received by tracking devices from sensors that are placed on the entity to be tracked. The tracking devices are activated when the tracking devices are connected to the placeholders by emergency response personnel. Once the tracking device is activated, the location information from the sensors received by the tracking devices is then transmitted to the system by the tracking devices.

Figure 2:
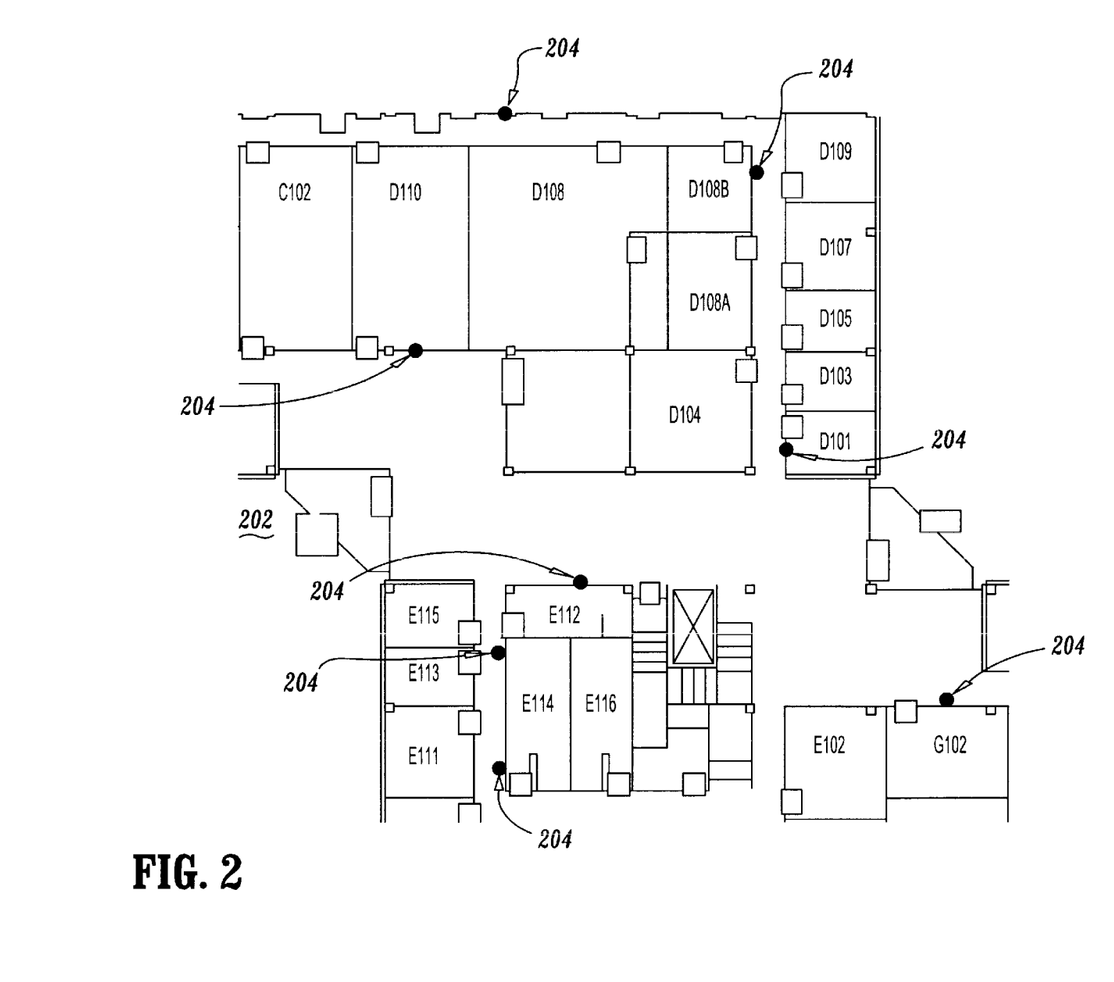
FIG. 2 illustrates predefined locations of fire extinguisher cabinets according to an embodiment of the present invention.

Referring to FIG. 2, digital floor plans 202 indicate all fixtures, such as, fire-extinguisher cabinets 204 that contain placeholders for the tracking devices. The digital floor plans 202 that contain activated tracking devices are input into the system so that the system can generate a mapping of the tracking location information. The system uses the coordinates of the activated tracking devices connected to the placeholders within the building to generate the mapping. Once the mapping is complete, emergency response personnel's officers will be able to locate the emergency response personnel and their equipment within the building.

Figure 3:
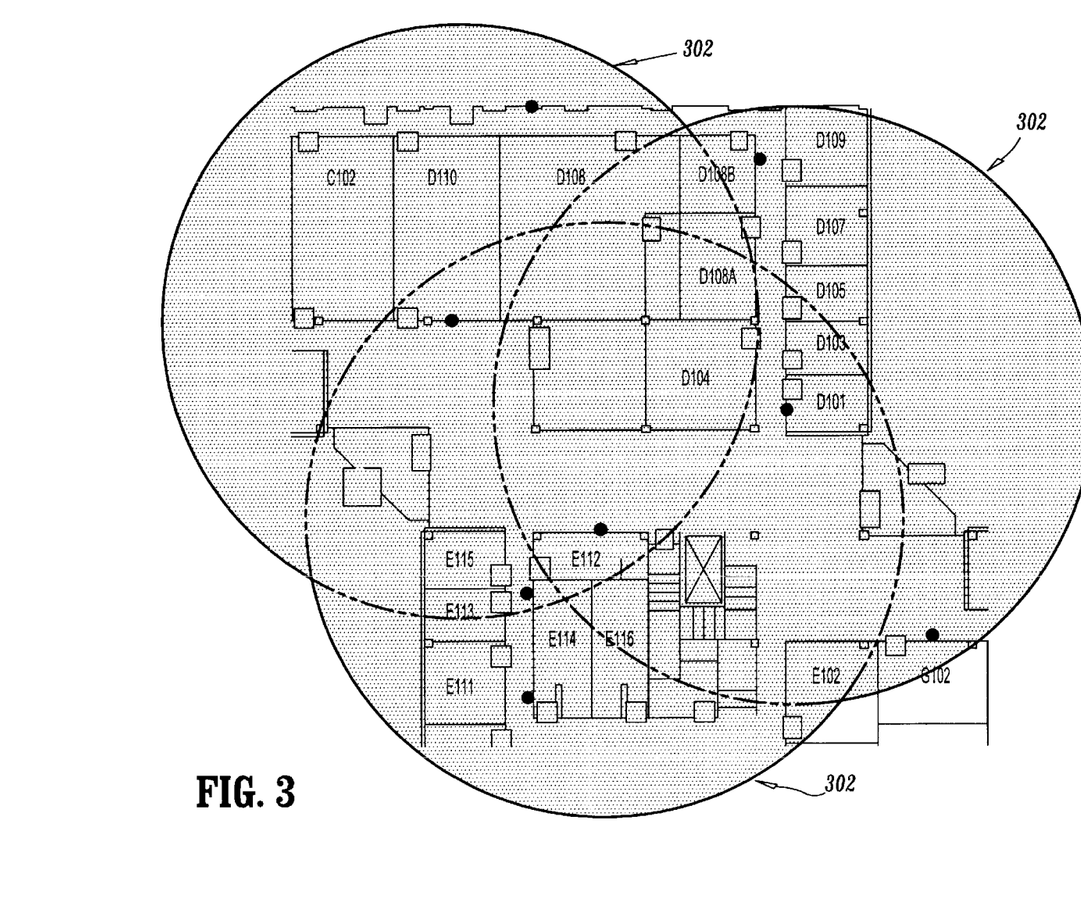
FIG. 3 illustrates a two dimensional picture of the best locations for positioning tracking devices.

Referring to FIG. 3, a two dimensional picture is illustrated that depicts the functional range 302 of the tracking devices put into the placeholders by emergency response personnel. The range of area 302 covered by the tracking devices is represented by each shaded circle. All emergency response personnel wearing sensors that enter the area 302 that is covered by a tracking device will be identified on a buildings floor plan viewable on an electronic display device or similar viewing device.

Figure 4:
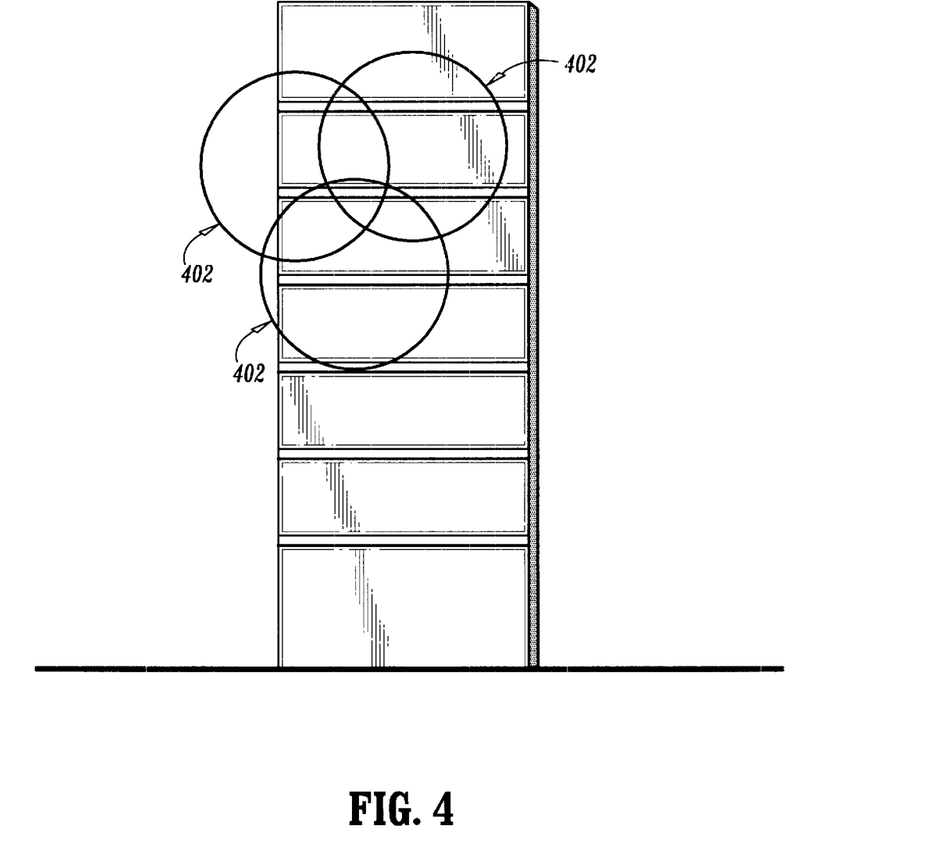
FIG. 4 illustrates a three dimensional picture of the best locations for positioning tracking devices.

FIG. 4 depicts a three dimensional picture that illustrates the functional range 402 of tracking devices put into placeholders by emergency response personnel. The range of area 402 covered by the tracking devices is represented by a shaded sphere. All emergency response personnel wearing sensors that enter an area 402 covered by the tracking device will be identified on the building's floor plans.

Figure 5:
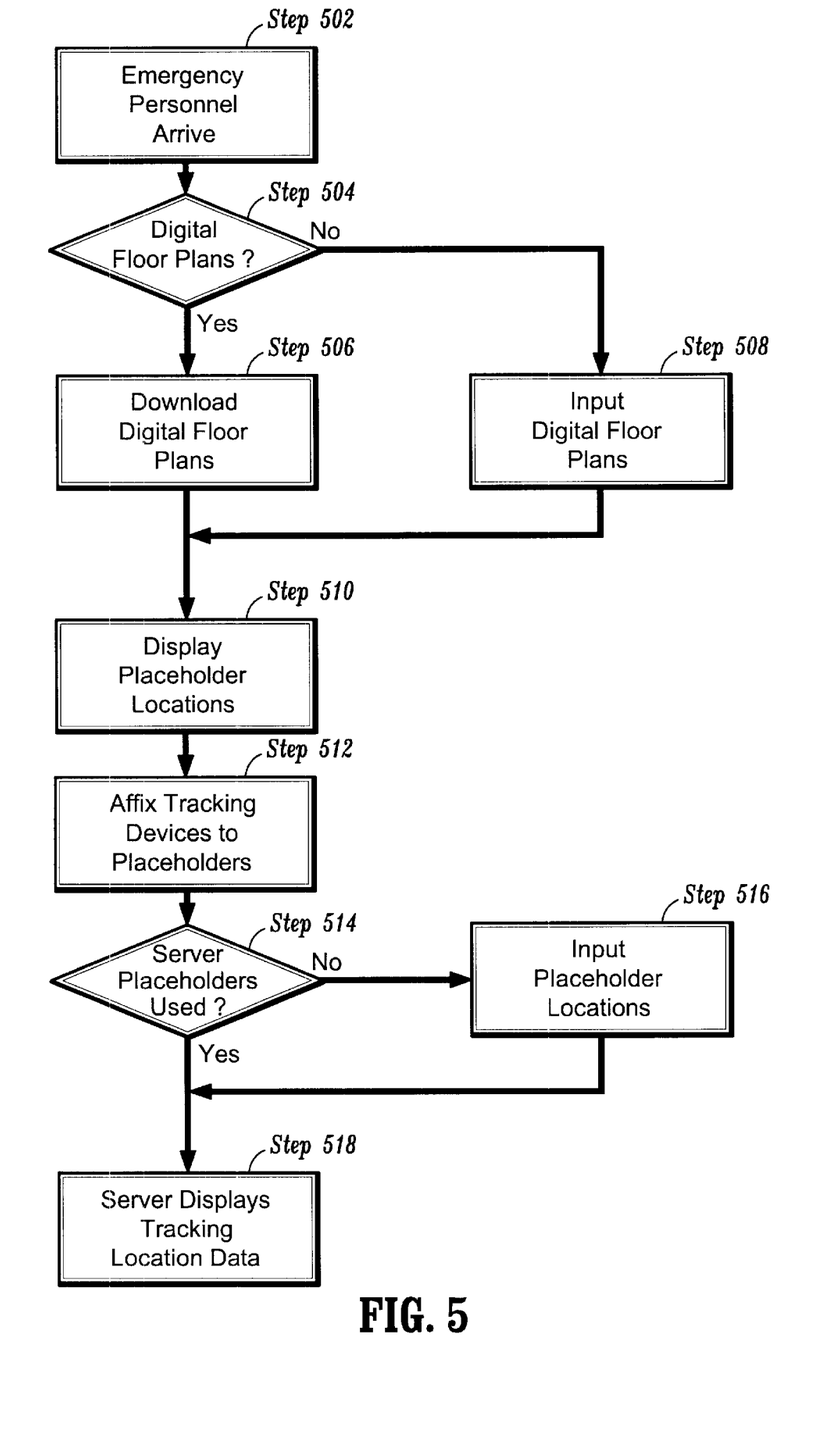
FIG. 5 is a flow chart illustrating a method for tracking, locating, and guiding according to an embodiment of the present invention.

FIG. 5 depicts an embodiment of a method of the present invention. Emergency response personnel arrive at a building that has an emergency situation in it (Step 502). The emergency response personnel determine whether or not the building has an information system that contains digital building floor plans that is accessible to the emergency response personnel (Step 504). If the building does contain an information system that is accessible by the emergency response personnel, the emergency response personnel download the digital floor plans and emergency location data into the emergency response personnel's main server that is located on a vehicle, for example, a fire truck (Step 506). If the building does not contain an information system that is accessible by the emergency response personnel, the emergency response personnel obtain a digital copy of the floor plans and the location of the emergency incident from building management personnel and input this data into the emergency response personnel's main server (Step 508). The main server, using an electronic display device, for example a computer screen, displays all placeholder locations necessary to cover the area of the emergency incident (Step 510). The emergency response personnel affix the tracking devices into the placeholders (Step 512). If the system displayed placeholders are not chosen by the emergency response personnel (Step 514), the emergency response personnel input the placeholder locations actually used into the system (Step 516). The server, using an electronic device, for example, a computer screen, displays tracking location data (Step 518).

Figure 6:
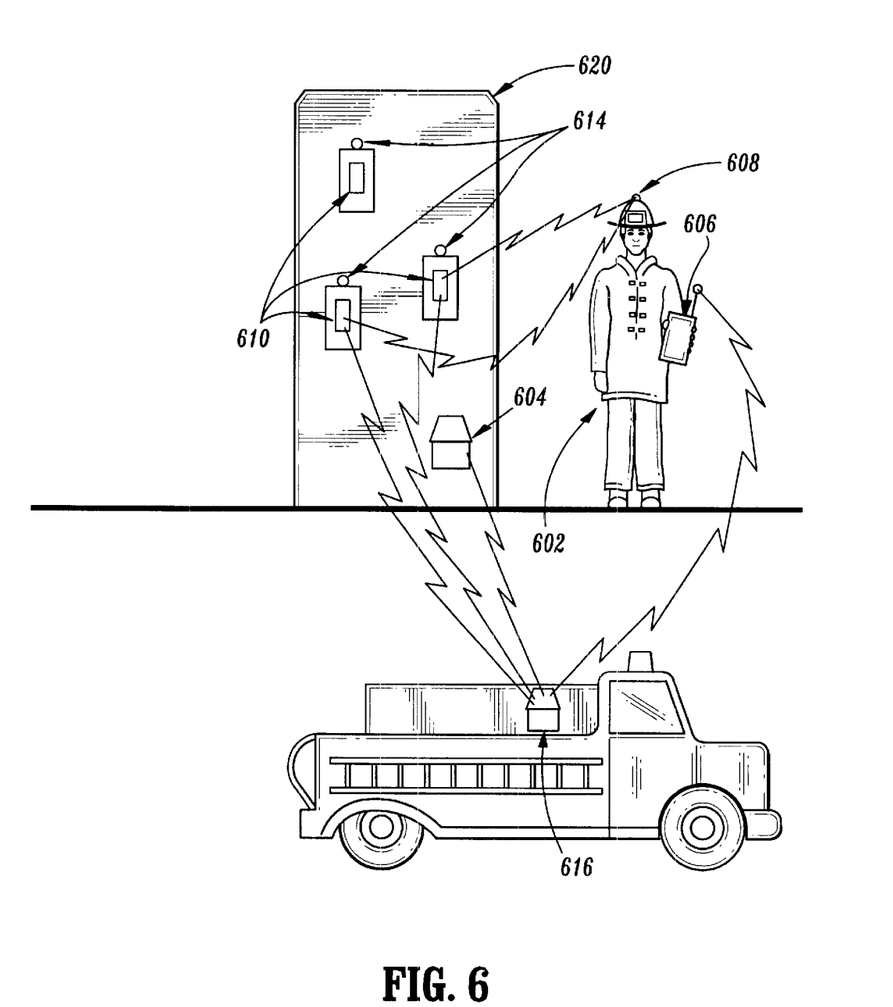
FIG. 6 depicts a system, according to an embodiment of the present invention, for tracking, locating, and guiding entities.

FIG. 6 illustrates a system according to an embodiment of the present invention, for tracking, locating, and guiding entities, in which, emergency response personnel, such as firefighters, are implementing the system.

Emergency response personnel 602 arrive at a building 620 that contains an emergency incident. The building 620 has its own information system that contains the building's digital floor plans 604. The building's floor plans 604 are digitally communicated to a main server 616 that is located on a vehicle, for example, a fire truck.

The emergency response personnel 602 who are wearing sensors 608 affix tracking devices 610 into placeholders 612 that are identified on the buildings floor plans. The placeholders 612 contain activation sensors 614 that activate the tracking devices 610 to begin receiving location data from sensors 608. The tracking devices 610 begin transmitting the location of the sensors 608 relative to the tracking device 610, to a main server 616. The main server 616 receives location data transmitted by the tracking devices and already has received the building's digital floor plans 604. The location data and the digital floor plans 604 are processed and combined by the main server 616. The main server 616 transmits the location of the emergency response personnel and the building's digital floor plans 604 to a handheld device 618 carried by emergency response personnel 602 that indicates the emergency response member's location on the building's digital floor plans.

The teachings of the present disclosure are preferably implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more Central Processing Units ("CPUs"), a Random Access Memory ("RAM"), and Input/Output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and an output unit.

It is to be further understood that, because some of the constituent system components and steps depicted in the accompanying drawings may be implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present disclosure is not limited to those precise embodiments, and that various changes and modifications may be effected therein by one of ordinary skill in the pertinent art without departing from the scope or spirit of the present disclosure. All such changes and modifications are intended to be included within the scope of the present disclosure as set forth in the appended claims.

What is claimed is:

1. A method for tracking, locating, and guiding an entity within a building, comprising the steps of:

entering a digital floor plan of said building into a server;

installing at least one of a plurality of placeholders at at least one of a plurality of various locations within said building;

indicating said various placeholder locations on said digital floor plan;

activating at least one of a plurality of tracking devices by connecting said at least one of a plurality of tracking devices to said at least one of a plurality of placeholders, wherein said activation includes continuous transmission of location data of the entity to be tracked to said server; and displaying by said server said location data.

2. The method of claim 1, wherein said at least one of a plurality of placeholders are installed at predetermined locations within said building.

3. The method of claim 1, wherein said at least one of a plurality of placeholders are installed at a predetermined height relative to a floor of said building.

4. The method of claim 1, wherein said at least one of a plurality of placeholders are installed at a random height relative to a floor of said building.

5. The method of claim 1, wherein said server is non-stationary.

6. The method of claim 1, wherein said server is stationary.

7. The method of claim 1, wherein said activating said at least one of a plurality of tracking devices, includes reception and transmission of location data of said entity to be tracked by said at least one of a plurality of tracking devices.

8. The method of claim 1, wherein said activating said at least one of a plurality of tracking devices, includes interactively communicating between said at least one of a plurality of tracking devices and said server.

9. The method of claim 1, wherein said displaying by said server, includes displaying by said server said building floor plans.

10. A system for tracking, locating, and guiding an entity within a building, comprising.

a digital floor plan of a building;

a server for processing said digital floor plan of said building;

at least one of a plurality of placeholders installed at at least one of a plurality of various locations within said building;

a location indicator device for indicating said various placeholder locations on said digital floor plan; and at least one of a plurality of tracking devices connected to said at least one of a plurality of placeholders for reception and continuous transmission of location data of said entity to said server for display on said digital floor plan.

11. The system of claim 10, wherein said at least one of a plurality of placeholders are installed in fixtures at a predetermined locations within said building.

12. The system of claim 10, wherein said at least one of a plurality of placeholders are installed in fixtures at a predetermined height relative to a floor of said building.

13. The system of claim 10, wherein said at least one of a plurality of placeholders are installed in fixtures at a random height relative to a floor of said building.

14. The system of claim 10, wherein said server is contained in a non-stationary device.

15. The method of claim 10, wherein said server is contained in a stationary device.

16. A system for tracking, locating, and guiding an entity within a building, comprising.

digital data means for describing floor plans of a building;

a computing means for processing said floor plans of said building;

at least one of a plurality of tracking means for reception and continuous transmission of location data of said entity;

at least one of a plurality of affixing means installed at at least one of a plurality of various locations within said building for affixing and activating said at least one of a plurality of tracking means;

a location indicator means for indicating said various affixing means locations on said digital data means; and a display means for displaying said location data transmitted by said at least one of a plurality of tracking means.

17. The system of claim 16, wherein said at least one of a plurality of affixing means are installed in housing means at predetermined locations within said building.

18. The system of claim 16, wherein said at least one of a plurality of affixing means are installed in housing means at a predetermined height relative to a floor of said building.

19. The system of claim 16, wherein said at least one of a plurality of placeholders are installed in housing means at a random height relative to a floor of said building.

20. The system of claim 16, wherein said computing means is non-stationary.

21. The method of claim 16, wherein said computing means is stationary.

22. The method of claim 16, wherein said display means includes said display means displaying said digital data means for describing building floor plans.

* * * * *